(12) United States Patent
Hauzeray et al.

(10) Patent No.: US 12,320,689 B2
(45) Date of Patent: Jun. 3, 2025

(54) METHOD FOR DETERMINING CHARACTERISTICS OF A FUEL SUPPLIED TO AN AIRCRAFT ENGINE

(71) Applicant: SAFRAN AEROSYSTEMS, Plaisir (FR)

(72) Inventors: Sylvain Hauzeray, Plaisir (FR); Gilles Delaitre, Plaisir (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 296 days.

(21) Appl. No.: 17/925,881

(22) PCT Filed: May 17, 2021

(86) PCT No.: PCT/FR2021/050849
§ 371 (c)(1),
(2) Date: Nov. 17, 2022

(87) PCT Pub. No.: WO2021/234257
PCT Pub. Date: Nov. 25, 2021

(65) Prior Publication Data
US 2023/0194322 A1 Jun. 22, 2023

(30) Foreign Application Priority Data
May 18, 2020 (FR) ...................................... 2004965

(51) Int. Cl.
*G01F 1/86* (2006.01)
*F02C 9/28* (2006.01)

(52) U.S. Cl.
CPC .................. *G01F 1/86* (2013.01); *F02C 9/28* (2013.01); *F05D 2220/323* (2013.01); *F05D 2240/36* (2013.01); *F05D 2260/80* (2013.01)

(58) Field of Classification Search
None
See application file for complete search history.

(56) References Cited

U.S. PATENT DOCUMENTS 3,739,635 A 6/1973 Stuart
6,157,894 A * 12/2000 Hess ....................... G01F 23/18
702/50

(Continued)

FOREIGN PATENT DOCUMENTS

EP 3 023 751 A2 5/2016

OTHER PUBLICATIONS

Search Report dated Jan. 13, 2021 issued by the French Patent Office in French Application No. 2004965.
(Continued)

*Primary Examiner* — Matthew G Marini
(74) *Attorney, Agent, or Firm* — Sughrue Mion, PLLC (57) ABSTRACT

On board an aircraft, a method is perform in which the following steps are implemented in the following order: measuring a first density value, a first dielectric constant value and a first temperature value of the fuel at a first time, measuring a second density value, a second dielectric constant value and a second temperature value of the fuel, determining parameters of a function for calculating a density from a temperature or a dielectric constant, measuring a volume flow rate value and at least one of a third temperature value and a third dielectric constant value of the fuel in a fuel injection duct in the engine, and determining a density value of the fuel and a mass flow rate of the fuel in the injection line.

12 Claims, 5 Drawing Sheets

(56) References Cited

U.S. PATENT DOCUMENTS

| | | | | |
|---|---|---|---|---|
| 8,515,694 B1* | 8/2013 | Orloff | ................ | G01F 23/804 |
| | | | | 73/1.72 |
| 2016/0123860 A1* | 5/2016 | McBrien | ............. | G01N 33/225 |
| | | | | 702/25 |

OTHER PUBLICATIONS

International Search Report dated Jul. 16, 2021 in International Application No. PCT/FR2021/050849.

* cited by examiner

METHOD FOR DETERMINING CHARACTERISTICS OF A FUEL SUPPLIED TO AN AIRCRAFT ENGINE

CROSS REFERENCE TO RELATED APPLICATIONS

This application is a National Stage of International Application No. PCT/FR2021/050849, filed May 17, 2021, claiming priority to French Patent Application No. 2004965, filed May 18, 2020, the contents of each of which being herein incorporated by reference in their entireties.

FIELD OF THE INVENTION

The invention relates to the identification of properties of the fuel on-board aircraft, in particular airplanes.

PRIOR ART

It is known that, in order to guarantee the range of an airplane in flight, its gauging system estimates the mass of fuel on board at any time, on the ground and in flight. The precision of the estimate depends on the number and precision of the sensors used, as well as on the physical quantities measured. The gauging system aims to obtain the required precision in the measurement of the mass of fuel on board, and to do so under the storage conditions in the tanks. However, for the pilot, the mass of fuel available is not a sufficient indicator. He needs to know the remaining range of his airplane. To make this change of indicator, the performance of the engine must be considered, but this is dependent on the properties of the fuel used. In addition, in order to adjust the injection cycle of the fuel into the engines, the engine control computer could use the gauging system measurements, but in fact this is not sufficient because the storage conditions in the tanks and the injection conditions are very different.

These difficulties are due, in particular, to the fact that the properties of the fuel during use are not fully known. To overcome this, the injection of the fuel into the engine is carried out so as to guarantee the performance and safety objectives, but without considering optimisation of consumption. In other words, the injection takes place with a margin which leads to an overconsumption.

This problem will be accentuated due to the increasing use of biofuels, increasing the variability in the properties of the fuels used by aircraft. Indeed, this overconsumption already exists when using standard kerosene, but it will increase with the use of biofuels with variable incorporation rates which can range up to 100%. This will generate a larger variability in the properties of fuels, which must be taken into account by increasing the overconsumption margins in order to continue to guarantee the safety of flights.

It is therefore desirable that the gauging system delivers all of the properties of the fuel to the engine control computer, enabling it to guarantee the performance and safety of the flight, while reducing this margin as much as possible.

For this reason, it is sought to estimate the properties of the fuel more precisely.

To this end, it is known that the gauging system incorporates a sensor for measuring fuel properties, in the tank or tanks. This characterisation is carried out by considering the temperature of the fuel.

More specifically, it is considered that the relation between the density of the fuel and its temperature is a linear function. This function, when plotted for different types of fuel, gives lines that are substantially parallel to one another. The same applies to the relation between the dielectric constant (K, also called the relative permittivity $e_r$) and the temperature. The relation between the dielectric constant K and the density D is also known. This relation is expressed by a formula derived from the so-called Clausius-Mossotti generic formula:

$$D=(K-1)/[A+B(K-1)]$$

These relations are known, for example, from U.S. Pat. No. 8,515,694 which also shows graphs of these functions.

All this information is sufficient for determining the mass of fuel on board, but not for predicting the properties of the fuel at the temperature of injection into the engines.

For that, these properties are estimated, more or less precisely, depending on the presence and, where appropriate, the type of sensor located in the fuel supply line of the engine. The various possible configurations are the following:

1) No sensor: the injection is carried out taking into account all the possible disparities of the fuel.

2) Temperature measurement: the injection is optimised with respect to the injection temperature, while still taking into account the disparity of the fuels.

3) In addition to the temperature measurement, the dielectric permittivity measurement makes it possible to reduce the disparity to be taken into account.

4) The optimum configuration would be to measure the density, but implementing this is very difficult due to density measurement technologies and local measurement conditions (temperature, vibrations).

The quantity of fuel injected is usually measured by a volume flow meter, and sometimes by a mass flow meter, although the latter has a very variable precision depending on the flow rate. Knowing the estimate of the properties of the fuel and taking into account the necessary safety margins, the injection into the engine is regulated by the use of the volume or mass flow meter. The measurement of volume flow rate is rather precise, but does not take into account the properties of the fuel, unlike the mass flow rate measurement which takes into account the density of the fuel, but which has a lower measurement precision.

An object of the invention is therefore to have better knowledge of the properties of the fuel injected into the engine in order to perform the metering with greater precision.

DISCLOSURE OF THE INVENTION

To this effect, a method is provided for determining properties of a fuel supplying an engine of an aircraft, in which method, on-board the aircraft, the following steps are implemented in the following order:

a first density value, a first dielectric constant value and a first temperature value of the fuel are measured at a first time;

a second density value, a second dielectric constant value and a second temperature value of the fuel are measured at a second time, chosen so that the first and second temperature values are different;

on the basis of the first and second values, parameters are determined of at least one function for calculating a density from a temperature or from a dielectric constant;

a volume flow rate value and at least one from among a third temperature value and a third dielectric constant value of the fuel in a fuel injection line into the engine, are measured;

by taking account of the third value or at least one of the third values, and at least one of the functions, a density value of the fuel is determined, and on the basis of the values for volume flow rate and density, a mass flow rate of the fuel in the injection line is determined.

Hence, this chain of steps enables a better knowledge of the properties of the fuel during injection into the engine and, therefore, better control of the quantity of fuel to be injected.

Indeed, in a first stage, the two first measurement steps are performed at times when the temperatures of the fuel are different. They therefore make it possible, in the third step, to obtain the parameters of at least one of the three abovementioned functions, in particular those making it possible to calculate a density on the basis of a temperature or a dielectric constant. This is, in particular, the case for the Clausius-Mossotti formula, making it possible to determine the parameters A and B. All or part of the general properties of the fuel are therefore known.

Then, in a second stage, the measurement of the volume flow rate, the dielectric constant and/or the temperature makes it possible to determine a value of its density in the injection line, before its injection into the engine. Since the mass flow rate is determined at this location, a quantity of fuel can be injected responding to the performance and safety requirements while limiting the quantity of overconsumed fuel, in other words without excessive margin.

Since this second stage is implemented on the injection line, in particular at the effective temperature at which the fuel is injected, the quantity of fuel injected is determined by closely taking into account its properties at this point and therefore with a particularly good precision.

Advantageously, the first and second density values are measured by means of the same density sensor, the first and second dielectric constant values by means of the same dielectric constant sensor, and the first and second temperature values by means of the same temperature sensor.

Hence, the measurements of the two first steps are performed at exactly the same location and the number of measurement devices remains reduced. Since the measurements are performed by the same devices, the accumulation of measurement imprecisions, which could otherwise arise by using different devices at the first and second time, is avoided.

It can be provided that, after the first time and before the second time, a step is implemented causing a temperature change of the fuel in a chamber where the measurements are performed at the first and second times.

Such a step leads to an intentional modification of the temperature between the two times. This makes it possible to avoid too long a period of time between the two times, as would be the case if a temperature change produced for some other reason was relied upon. The law or laws for characterising the fuel are therefore obtained at the end of a short period.

The step causing the temperature change could be implemented by heating the fuel in the enclosure, without introducing fuel into the enclosure.

In an embodiment, in the enclosure, the fuel coming from the fuel injection system is introduced into the engine.

This is a particularly efficient way of obtaining the abovementioned temperature change.

This injection of fuel coming from the engine into the enclosure makes it possible to obtain several effects according to the configuration of the enclosure:

exchanger mode: there is no mixing of fuel but only an exchange of heat in order to change the temperature;

mixing mode: the two liquids mix so that the temperature changes as a function of their respective contents in the mixture;

replacement mode: the incoming liquid pushes back the liquid that is present, taking its place; and mixed mode: this is a mixture of two or three of the preceding modes.

The third mode is that which offers the shortest transition time.

It will be possible, in particular, to use a chamber like that of document WO 2018/002682.

In order to implement the exchanger mode strictly, a pure heat exchanger is required. However, in general, without thermal insulation, there are necessarily heat exchanges.

The mixing mode is the most intuitive.

The replacement mode is close to that of document WO 2018/002682, but this mode is difficult to implement strictly. In reality, there is a little mixing and heat exchange, but this is very effective, much more than the mixing mode. The liquid entering the enclosure replaces the preceding liquid, whatever their respective temperatures and densities. It is the structure of the enclosure detailed in WO 2018/002682 which allows this effect.

It is possible to implement the two first steps of the method of the invention in a fuel tank.

This is a particularly appropriate location for making the measurements in question. However, it is possible to make these measurements at another location, for example on a line passing the fuel from the tank to the injection system.

Advantageously, parameters of a function for calculating a dielectric constant as a function of a temperature are determined.

Indeed, it may be useful in certain embodiments of the invention to also know this law associated with the properties of the fuel.

In an embodiment, the third temperature value and the third dielectric constant value are measured.

The measurement of these two quantities provides a redundancy, so as to be able to detect an anomaly or a possible failure and to take this into account when determining the density of the fuel.

Advantageously, a fourth temperature value of the fuel in the injection line is measured.

This temperature measurement redundancy also makes it possible to detect a failure or a potential anomaly and to overcome it. This makes it possible to carry out a test on the temperature values obtained and, for example, to discard a suspect or clearly unreliable value.

One possibility for this consists in determining whether a difference between the third and fourth temperature values exceeds a predetermined threshold.

If the threshold is exceeded, this means that at least one of the temperature sensors is giving an unreliable value. The threshold is equal, for example, to twice the value of a tolerance interval of the temperature measurement chain relative to the sensor. Hence if this interval is 0.1° C., then the threshold will be, for example, 0.2.

Advantageously:

on the basis of the respective third values and by means of the functions, test values of the density are calculated, for the or each pair of test values considered, two-by-two, it is determined whether a difference between the test values exceeds a predetermined threshold, and the density value of the fuel is determined as a function of the result of this determination.

Hence, here again, having several test values ensures a redundancy which enables an anomaly or a failure to be detected and taken into account. For example, in the presence of a sole pair of test values, the exceeding of the threshold is the sign of an anomaly. In the presence of two or more test values, it is possible to choose to keep only one or more of the test values and to no longer use one or more others which are identified as suspect. The result of this comparison of the test values can also be advantageously combined with that of the comparison of the third and fourth temperature values where appropriate, knowing that one or more of the test values results from a calculation performed on the basis of one of these temperature values. If a plurality of test values do not present any anomaly, one of them can be used, or all of them can be used by taking the mean, for example, in order to determine the density value to take into account in the remainder of the method.

Hence, in an embodiment, at the end of the above-mentioned first two steps, the density value is determined without taking into account one, two or three of the test values.

The density value can be determined by taking account of at least one other value obtained during the implementation of the method of the invention for another engine of the aircraft, or by taking account of at least one other predetermined function, in particular without taking account of the test values.

In the first case, the values measured on the first engine are therefore completely discounted and the precise properties of the fuel obtained using the method continue to be used, but when it is implemented on another engine of the airplane.

In the other case, the function is for example a default function which therefore does not take strict account of the properties of the fuel as injected. This may involve one or more fuel characterisation laws such as mentioned above, but in a general version which is not precisely adapted to the fuel used in this case.

The invention also relates to an aircraft comprising:
at least one engine,
at least one fuel tank,
a system for injecting fuel into the engine,
devices for measuring a density, a dielectric constant and a temperature of the fuel, and
a control device configured to control the execution of the steps of the method according to the invention.

In an embodiment, the aircraft comprises:
a chamber located in the tank and comprising the measurement devices,
a line for introducing fuel into the chamber from the injection system, the line directly connecting the injection system to the chamber, and
a valve in the line capable of preventing the introduction into the chamber, via the line, of fuel coming from the injection system.

This is also an arrangement that is particularly well-suited to increasing the temperature of the fuel in the chamber between the first and second times.

DESCRIPTION OF THE FIGURES

An embodiment of the invention will now be described by way of a non-limiting example with support of the drawings, in which.

Figure 1:
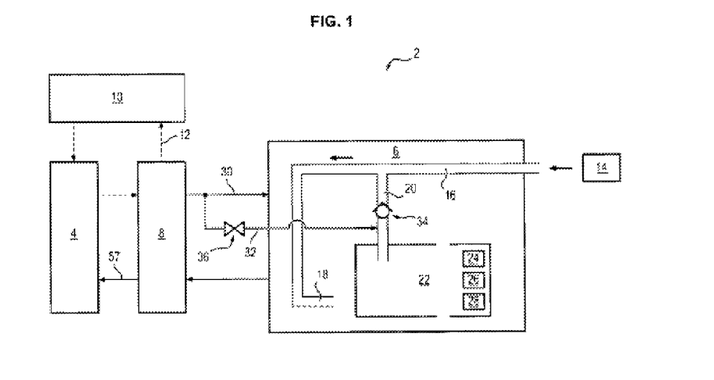
FIG. 1 is a diagram showing an injection circuit of an aircraft and one of its tanks, in an embodiment of the invention.

FIG. 1 shows an aircraft according to an embodiment of the invention, such as an airplane 2. This airplane comprises a plurality of engines 4, for example turbojet engines. It is assumed, for example, that the airplane has at least one engine on each side of a fuselage of the airplane.

The airplane also comprises fuel tanks, one of which 6 is illustrated in the figures. It is also equipped with a system 8 for injecting fuel into the engine, which also ensures a heat exchange with a cooling fluid formed by the oil circulating from an oil tank 10. Hence, as illustrated in FIG. 1 by the dashed-line arrows, the oil 12 passes from the oil tank 10 into the engine 4 in order to cool it, then into the injection system 8 to heat the fuel which passes through the latter in order to supply the engine 4. Finally the oil returns to its tank 10. This figure provides a summary illustration of the fuel circuit.

The airplane has a fuel filler port 14 for supplying the tank with fuel from outside the airplane. It communicates with a filling line 16 extending outside and inside the tank 6 to a terminal end 18 of the line opening into the tank. A measurement line 20 extends from a centre portion of the filling line 16 and diverts part of the fuel flow from the latter to a measurement chamber 22 extending inside the tank 6 and communicating with the latter so that the fuel can pass freely from the chamber to the rest of the tank and vice versa. This chamber 22 is equipped with sensors for measuring the properties of the fuel in the tank. In the present example, this respectively involves a density sensor 24, a dielectric constant sensor 26 and a temperature sensor 28.

The fuel circuit is illustrated by the solid lines in FIG. 1. Hence the fuel passes from the tank 6 to the injection system 8, then is injected by the latter into the engine 4 via the injection line 57. Since excess fuel frequently arrives in the injection system 8, part of it is sent back to the tank 6 via a reintroduction line 30 which opens directly into the tank.

In the present example, this reintroduction line is equipped with a bypass line which forms an introduction line 32 which places it in direct communication with a central part of the measurement line 20. The introduction line is connected to the reintroduction line in a region located between the system 8 and the tank 6 in the present example. In this way, the fuel passing from the introduction line 32 into the measurement line 20 is directly introduced into the chamber 22 without passing via the general volume of the tank and without mixing with the rest of the fuel located there. The measurement line 20 is equipped with a non-return valve 34 in order to prevent the fuel rising in the filling line 16 on this occasion. The non-return valve 34 only opens during filling of the tank from outside the aircraft. Finally, the introduction line 32 is equipped with a valve 36 which can interrupt the passage of fuel therein when desired.

The chamber 22 is produced, for example, as described in document WO 2018/002682 in order that the modification of the fuel circuit in order to implement the invention can be mainly limited to the addition of the line 32 with its valve 36.

Figure 2:
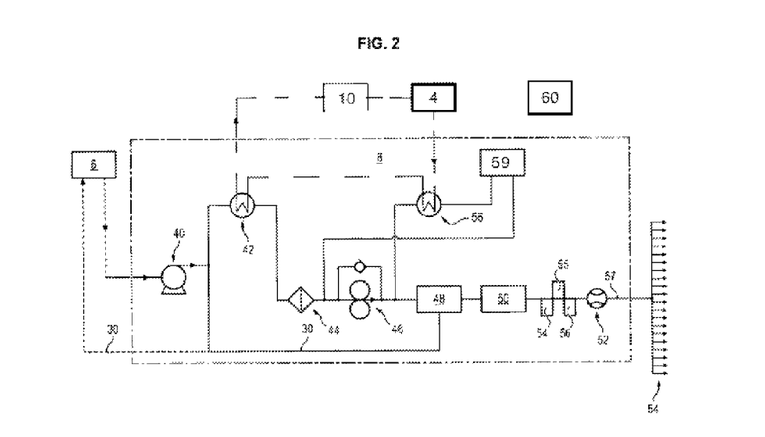
FIG. 2 is a more detailed view of the injection circuit of the aircraft of FIG. 1, FIGS. 3 to 5 show curves representing functions connecting the density and the dielectric constant as a function of the temperature and the density.

A more detailed version of the injection system 8 is illustrated in FIG. 2. The fuel coming from the tank 6 passes through a low-pressure centrifugal pump 40 then a heat exchanger 42 with the oil, a filter 44 and a high-pressure pump 46. In the remainder of the circuit, which is at high pressure, the fuel passes through a fuel meter 48 then a cut-off valve 50, a flow meter 52 and then arrives in the injectors 54. The oil passes from the tank 10 to exchanger 58 then to exchanger 42 in order then to be directed to the engine 4.

Downstream of the pump 46 and upstream of the metering device 48, a part of the fuel is diverted to a heat exchanger 58 with the oil, then to cylinder servo valves 59 in order to be finally reintroduced into the low-pressure circuit upstream of the pump 46. These cylinders are cylinders of the engine in which the fuel is used as hydraulic fluid (it involves for example air bleed control cylinders).

A part of the fuel located in the metering device 48 is sent via the reintroduction line 30 to the tank 6. The line 30 is at low pressure and is also referred to as a fuel recirculation line. It is used to return the excess pumped fuel to a point upstream of the high-pressure pump 46 since, according to the operating phases of the engine, a more or less significant part of the flow supplied by this pump is in excess compared to the flow rate which must be supplied from the metering device to the combustion chamber of the engine. The fuel returned upstream of this pump can be entirely reintroduced into the circuit downstream of the low-pressure pump 40, but it is also possible to reintroduce all or part of this fuel return into the fuel tank 6, as is the case here.

The injection line 57 bearing the flow meter 52 is also equipped with two temperature sensors 54, 55 and a dielectric constant sensor 56.

In this case the fuel is kerosene but it could also be a mixture of kerosene with biofuel, or even 100% biofuel.

Finally the airplane comprises computer control means 60 comprising processing means and one or more memories, connected to the various elements of the airplane. These means are configured so as to implement, on-board the airplane, the method comprising the steps which are now described.

In a first step, at a first time, measurement is made of:
a first density value $D_1$,
a first dielectric constant value $K_1$ and
a first temperature value $T_1$.

These measurements are performed by means of the sensors 24, 26 and 28 of the chamber 22 and concern the fuel located in the chamber, inside the tank 6. They are performed when the fuel return valve 36 is closed.

Then, the fuel coming from the injection system 8 is introduced into the chamber 22. For this purpose, valve 36 is opened, which causes a flow of fuel into the introduction line 32 then directly into the measurement line 20 and to the chamber 22. Since this fuel comes from the injection system 8, it is at a temperature higher than that of the fuel initially found in the chamber 22. This therefore causes a temperature change of the fuel in the chamber 22. The above-mentioned replacement mode is implemented here with, in addition, a small amount of mixing and heat exchange.

It is also observed that, then, when the entry of the fuel via the line stops, i.e. with the valve 36 closed, the fuel from the tank pushes on that in the chamber in order to take its place. This enables a cyclic operation for the alternating measurement of the properties of the fuel in the tank and of that returning from the injection system.

Then, at a second time, the same sensors are used to measure, in the chamber:
a second density value $D_2$,
a second dielectric constant value $K_2$ and
a second temperature value $T_2$ of the fuel.

This second time follows the arrival of the heated fuel so that the first and second temperature values $T_1$, $T_2$ are different. The same applies for the other first and second values.

As can be seen, in this example, the first and second density values $D_1$, $D_2$ are therefore measured by means of the same density sensor 24, the first and second dielectric constant $K_1$, $K_2$ by means of the same dielectric constant sensor 26, and the first and second temperature $T_1$, $T_2$ by means of the same temperature sensor 28.

In a following step, the parameters of the functions $f_1$, $f_2$ and $f_3$ are determined on the basis of the first and second values, as:

$D=f_1(T), D=f_2(K)$ and $K=f_3(T)$ making it possible to calculate, respectively:
a density D from a temperature T,
a density D from a dielectric constant K, and
a dielectric constant K as a function of a temperature T.

Figure 3:
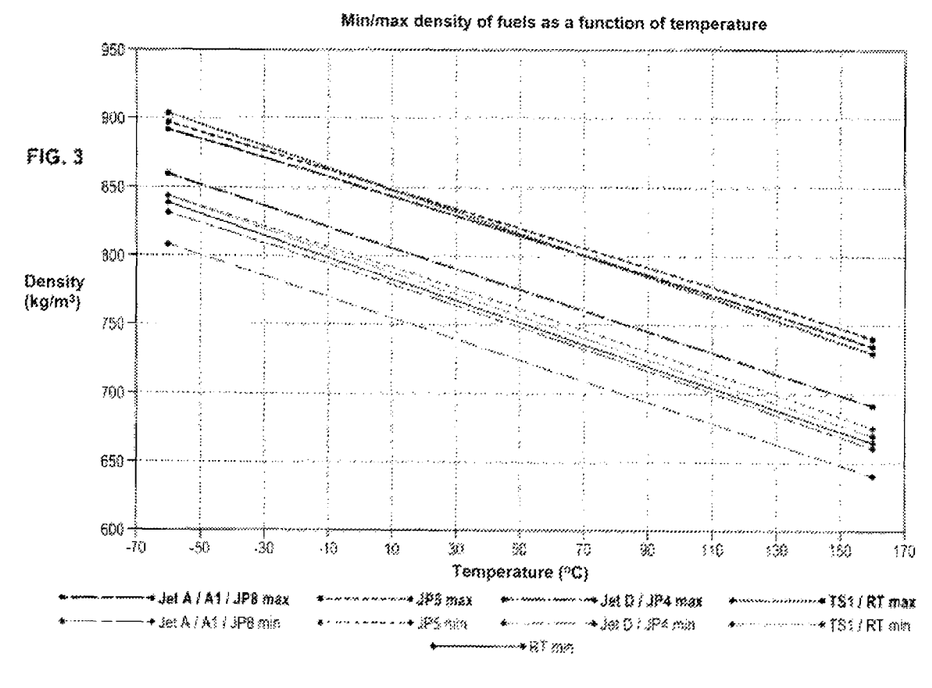
Figure 4:
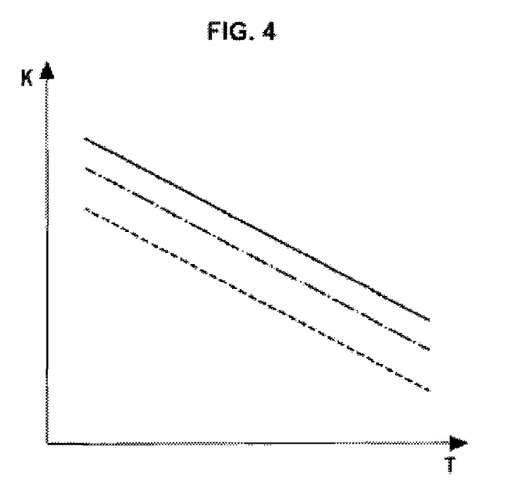

These three functions are those which have been described above. $f_1$ and $f_3$ have a classical affine linear equation of type y=cx+e. Their graphs are illustrated in FIGS. 3 and 4 respectively for various types of fuel used in airplane engines.

The second function $f_2$ is that of the above-mentioned formula derived from the so-called generic "Clausius-Mossotti" formula and has an equation of type:

$D=(K-1)/[A+B(K-1)]$

Figure 5:
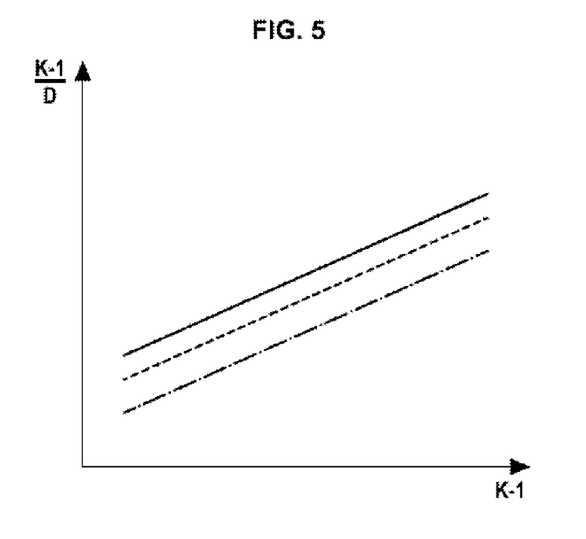

If it is assumed that x=K−1 and that y=(K−1)/D as is the case in document US2016/0123860, an affine linear formula is obtained of type y=cx+e, the graph of which is illustrated in FIG. 5.

It is important to note that the use of affine equations in the present case for the three formulas is a choice, and that other types of formulas are possible.

Under these conditions, knowing the first and second measured values, the computer is able to determine the parameters c and e for each of the two functions $f_1$, $f_3$ and the parameters A and B for function $f_2$. In this way, the three functions or laws governing the relations between the properties of the fuel are determined. Hence the three quantities measured at two different temperatures enable the fuel to be precisely characterised and to predict the change in one of the quantities over time on the basis of one of the others, using the three functions.

In a following step, in the line 57 for injecting fuel into the engine, a measurement is made by means of the flow meter 52 and sensors 54, 55 and 56, with regard to the fuel in the line, of:
a value of volume flow rate DV,
third and fourth temperature values $T_3$, $T_4$, and
a third dielectric constant value $K_3$.

It is then determined whether the absolute value of a difference $T_3-T_4$ between the third and fourth temperature values exceeds a predetermined threshold. This threshold is chosen, in this case, as being equal to twice the tolerance interval associated with each temperature sensor 54, 55. However, it is possible to take into account another threshold value.

Furthermore, on the basis of the respective values $T_3$, $T_4$ and $K_3$ and by means of functions $f_1$, $f_2$ and $f_3$, test values $D_a$, $D_b$, $D_c$ of the density are calculated as follows:

$D_a=f_1(T_3) D_b=f_2(T_4) D_c=f_3(K)$

Then, for each pair of test values considered, two-by-two, it is determined whether a difference in absolute value between the test values exceeds a predetermined threshold. Then $|D_a-D_b|$, $|D_a-D_c|$ and $|D_b-D_c|$ are successively compared to this threshold.

The result of these four tests is then taken into account in order to determine the density value $D_3$ to be considered in the rest of the method.

In the present example, a truth table is predetermined in order to respond to all the cases encountered. The names given to these tests and the table are presented below:

T_valid=If ($|T-T'|$<=authorised deviation) then OK (1/true) else NOK (0/false)

Dab_valid=If ($|D_a-D_b|$<=authorised deviation) then OK (1/true) else NOK(0/false)

Dac_valid=If ($|D_a-D_c|$<=authorised deviation) then OK (1/true) else NOK(0/false)

Dbc_valid=If ($|D_b-D_c|$<=authorised deviation) then OK (1/true) else NOK(0/false)

ing to the delivery of an erroneous measurement by a sensor. The complete failure case is that illustrated in the three underlined boxes which are cases (00, 10), (00, 01) and (11, 00). It can also be seen that only the last box at the bottom right of the table is associated with the absence of any anomaly and takes into account the three values $D_a$, $D_b$ and $D_c$ for the calculation of the density. The detection of an anomaly or a failure makes it possible to dismiss the suspect value or values for the remainder of the method as originating from an erroneous measurement.

In a last step, a mass flow rate DM of the fuel in the injection line 57 is determined on the basis of the thus determined values of volume flow rate DV and density $D_3$.

This knowledge of the mass flow rate of the fuel under the conditions of injection into the engine 4 enables a more

| | | | Truth table | | |
|---|---|---|---|---|---|
| | | D | | Dac_Valid Dbc_Valid | |
| | | used | 00 | 10 | 01 | 11 |
| | 00 | $D_c$ | $(D_a+D_c)/2$ | $(D_b+D_c)/2$ | $D_c$ |
| | 10 | D default | $D_a$ | $D_b$ | $D_c$ |
| T_Valid Dab_Valid | 01 | D default | $D_a$ | $D_b$ | $D_c$ |
| | 11 | $(D_a+D_b)/2$ | $(D_a+D_b)/2$ | $(D_a+D_b)/2$ | $(D_a+D_b+D_c)/3$ |

Each box of the table contains the density value D which will be taken into account for the rest of the method as a function of the test results. (Some values are underlined for reasons explained below). For example, at the intersection of row "10" and column "01", the density value used for $D_3$ is $D_b$. This is a situation in which the following results are cumulated:

the test on the temperatures gives the value "true", $|D_a-D_b|$ exceeds the threshold, $|D_a-D_c|$ exceeds the threshold, and $|D_b-D_c|$ does not exceed the threshold.

As can be seen, in certain cases, it is one of the following values which is used for $D_3$: $D_a$, $D_b$, $D_c$, $(D_a+D_b)/2$, $(D_a+D_c)/2$, $(D_b+D_c)/2$, or $(D_a+D_b+D_c)/3$.

In the other cases, which correspond to the degraded mode in the presence of at least two failures, it is the default value which is used. This is primarily another value obtained during the implementation of the method of the invention on the other engine of the aircraft located on the other side of the fuselage. If this is no longer available, it is a value calculated on the basis of a default function giving the properties of a standard fuel and stored in the memory of the computer without taking account of the results of the sensor measurements in the chamber 22. Alternatively, this latter value can be used directly by default, without using the value given for the other engine. The default value takes into account the margins necessary to guarantee reliability and safety.

As can be seen in this table, in certain cases, the density value $D_3$ is determined without taking account of one, two or three of the test values $D_a$, $D_b$ and $D_c$.

In the present embodiment, the measurement of two temperature values $T_3$ and $T_4$ and of a dielectric constant value $K_3$ in the injection line 57 enables a redundancy which makes it possible, in return, to detect the occurrence of an anomaly or a failure, or even a complete failure correspond-precise metering without compromising the performance, reliability and safety, and while reducing the margin of overconsumption.

The arrangement illustrated in FIG. 1 is particularly well suited to the determination of the properties of the fuel on the basis of the measurements performed in the tank 6 in order to take them into account for the determination of its properties in the injection line 57, which is advantageous for a precise metering of the injected fuel.

Figure 6:
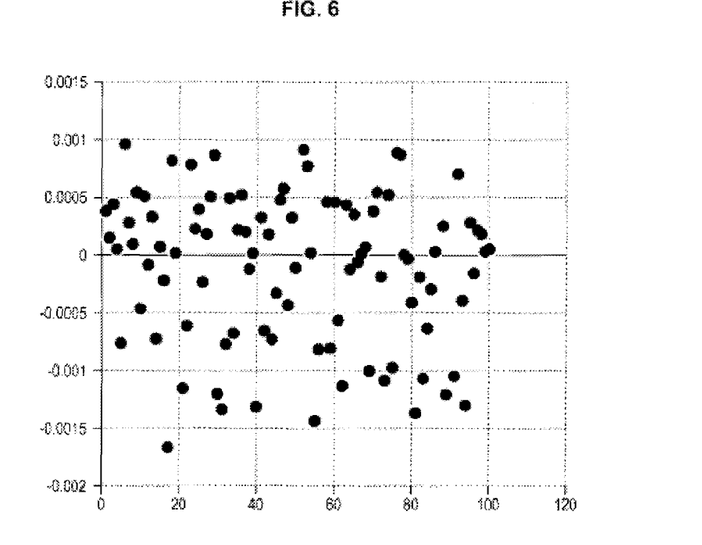
FIG. 6 is a point cloud showing a test result of the method of the invention.

FIG. 6 illustrates the result of a simulation of the method of the invention implementing 100 random selections of the values $T_3$, $T_4$ and K generating errors on the latter with respect to the values expected for a fuel of predetermined density $D_p$. A density value $D_d$ was obtained by implementing the above method and was compared with this predetermined value $D_p$. It is the difference between these two values which is illustrated on the ordinate in the figure, with the random number appearing on the abscissa. It is seen that the difference in absolute value never exceeds 2/1000, which demonstrates the reliability of the method of the invention.

Of course, numerous modifications could be made to the invention without going beyond its scope.

Many different strategies are possible for determining the density of the fuel on the basis of the quantities measured in the injection line 57. If a table is used, this could be different from the table presented above. For example, in certain cases, it could be possible to use the default value in a place where it is not currently used, or other values than those which appear there. It is also possible to dispense with calculating an average of certain values or all the values as is the case in some boxes and simply substitute one of the values there.

Some redundancies could be dispensed with.

By way of example also, the value of the dielectric constant obtained by calculation on the basis of the measured temperature is not used in the strategy presented above for determining the density to be taken into account. However, it could be used in another strategy, for example by comparing this calculated value with the measured value of the constant.

The invention claimed is:

1. A method,
the method comprising determining properties of a fuel supplying an engine of an aircraft, wherein the aircraft includes the engine, a fuel tank, a chamber included in a portion of the fuel tank, and an injection system configured to inject fuel from the fuel tank into the engine through a fuel injection line,
wherein the chamber is equipped with first sensors including a density sensor, a dielectric constant sensor, and a temperature sensor, and
wherein the injection line is equipped with second sensors including a volumetric flow meter, a second temperature sensor, and a second dielectric constant sensor,
the method, implemented by the aircraft, comprises the following steps in order:
measuring a first density value, a first dielectric constant value and a first temperature value of the fuel in the chamber at a first time with the first sensors,
measuring a second density value, a second dielectric constant value and a second temperature value of the fuel in the chamber at a second time with the first sensors, the second time chosen so that the first temperature value and the second temperature values are different;
based on the first density value, the first dielectric constant value, the first temperature value, the second density value, the second dielectric constant value and the second temperature value, determining parameters of at least one function for calculating a density from a temperature or from a dielectric constant;
measuring a volume flow rate value and at least one from among a third temperature value and a third dielectric constant value with the second sensors of the fuel in the fuel injection line into the engine;
based on at least one of the third temperature value and the third dielectric constant value, and the at least one function, determining a density value of the fuel in the fuel injection line, and
based on the volume flow rate and the determined density, determining a mass flow rate of the fuel in the fuel injection line.

2. The method according to claim 1, in which the first density value and the second density value are measured by a same density sensor, the first dielectric constant value and the second dielectric constant value are measured by a same dielectric constant sensor, and the first temperature value and the second temperature value are measured by a same temperature sensor.

3. The method according to claim 1, further comprising after the first time and before the second time, causing a temperature change of the fuel in a chamber where the measurements are performed at the first and second times.

4. The method according to claim 3, in which fuel coming from the injection system is introduced into the chamber through an introduction line.

5. The method according to claim 1 in which, by means of the first density value, the first temperature value and the first dielectric constant value, the second density value, the second temperature value and the second dielectric constant value, parameters of a function for calculating a dielectric constant as a function of a temperature are determined.

6. The method according to claim 1, further comprising measuring a fourth temperature value of the fuel in the fuel injection line.

7. The method according to claim 6, further comprising determining whether a difference between the third temperature value and the fourth temperature value exceeds a predetermined threshold.

8. The method according to claim 1, wherein the determining the density value of the fuel in the fuel injection line comprises:
based on the respective third temperature value and third dielectric constant value and by means of the at least one function, calculating test values of the density;
for the or each pair of test values considered, two-by-two, determining whether a difference between the test values exceeds a predetermined threshold; and
determining the density value of the fuel as a function of a result of determining whether a difference between the test values exceeds a predetermined threshold.

9. The method according to claim 8, wherein the determining the density value of the fuel in the fuel injection line further comprises:
after determining the density value of the fuel as the function of the result of determining whether the difference between the test values exceeds the predetermined threshold, determining the density value without taking account of one, two or three of the test values.

10. The method according to claim 1, in which the density value is determined based on at least one other value obtained during the method according to claim 1 for another engine of the aircraft, or by taking account of at least one other predetermined function.

11. The method according to claim 10, in which the density value is determined based on at least one other predetermined function without taking account of the test values.

12. An aircraft comprising:
at least one engine,
at least one fuel tank comprising a chamber provided therein,
a system for injecting fuel from the at least one fuel tank and into the engine through a fuel injection line,
first sensors provided in the fuel tank and comprising a density sensor, a dielectric constant sensor and a temperature sensor, for measuring a density, a dielectric constant and a temperature of the fuel in the chamber,
second sensors provided in the fuel injection line and comprising a volumetric flow meter, a second temperature sensor, and a second dielectric constant sensor for measuring a volumetric flow, a temperature and a dielectric constant of the fuel in the fuel injection line, and
a memory, and at least one processor configured to:
control the first sensors to measure a first density value, a first dielectric constant value and a first temperature value of the fuel in the at least one fuel tank at a first time with the first sensors,
control the first sensors to measure a second density value, a second dielectric constant value and a second temperature value of the fuel in the at least one fuel tank at a second time, the second time chosen so that the first temperature value and the second temperature values are different;
based on the first density value, the first dielectric constant value, the first temperature value, the second density value, the second dielectric constant value and the second temperature value, determine parameters of at least one function for calculating a density from a temperature or from a dielectric constant;

control the second sensors to measure a volume flow rate value and at least one from among a third temperature value and a third dielectric constant value of the fuel in the fuel injection line into the engine;

based on at least one of the third temperature value and the third dielectric constant value, and the at least one function, determine a density value of the fuel in the fuel injection line, and based on the volume flow rate and the determined density, determine a mass flow rate of the fuel in the fuel injection line.

* * * * *